US006983719B2

(12) United States Patent
Armstrong

(10) Patent No.: US 6,983,719 B2
(45) Date of Patent: Jan. 10, 2006

(54) ANIMAL BEHAVIOR TRAINING APPARATUS

(76) Inventor: Gavin Armstrong, 6 Sandringham Gardens, Prehen, Londonderry BT 47HD, County Londonderry, Northern Ireland (GB)

( * ) Notice: Subject to any disclaimer, the term of this patent is extended or adjusted under 35 U.S.C. 154(b) by 0 days.

(21) Appl. No.: 10/362,885

(22) PCT Filed: Aug. 30, 2001

(86) PCT No.: PCT/GB01/03884

§ 371 (c)(1),
(2), (4) Date: Oct. 24, 2003

(87) PCT Pub. No.: WO02/17709

PCT Pub. Date: Mar. 7, 2002

(65) Prior Publication Data

US 2004/0050342 A1 Mar. 18, 2004

(51) Int. Cl.
*A01K 29/00* (2006.01)
(52) U.S. Cl. .................... 119/51.02; 119/169
(58) Field of Classification Search ............ 119/51.02, 119/169, 52.1, 57.1, 165; 222/161, 196, 222/199; 414/199
See application file for complete search history.

(56) References Cited

U.S. PATENT DOCUMENTS

| | | | | |
|---|---|---|---|---|
| 3,534,787 A | * | 10/1970 | Heck | 222/196 |
| 4,722,300 A | | 2/1988 | Walker | 119/51.11 |
| 4,756,277 A | | 7/1988 | Peng | 119/57.1 |
| 4,779,569 A | * | 10/1988 | Lopez | 119/57.1 |
| 5,104,002 A | * | 4/1992 | Cahlander et al. | 222/196 |
| 5,314,090 A | * | 5/1994 | Alexander | 222/196 |
| 5,564,364 A | * | 10/1996 | Kovacs et al. | 119/165 |
| 5,630,376 A | * | 5/1997 | Ochi et al. | 119/169 |
| 5,657,902 A | * | 8/1997 | Kraus | 222/196 |
| 6,041,737 A | * | 3/2000 | Hennigan | 119/165 |
| 6,044,795 A | * | 4/2000 | Matsuura et al. | 119/51.02 |
| 6,460,484 B2 | * | 10/2002 | Ikegami et al. | 119/169 |
| 6,698,384 B2 | * | 3/2004 | Markowitz | 119/165 |

FOREIGN PATENT DOCUMENTS

| | | |
|---|---|---|
| DE | 43 03 001 A1 | 8/1994 |
| DE | 299 03 361 U | 5/1999 |
| DE | 299 03 361 U1 | 7/1999 |
| EP | 0 384 531 | 8/1990 |
| EP | 0 384 531 A | 8/1990 |
| EP | 43 03 001 A | 8/1994 |

* cited by examiner

*Primary Examiner*—Teri Pham Luu
*Assistant Examiner*—Elizabeth Shaw
(74) *Attorney, Agent, or Firm*—Ronald E. Greigg

(57) ABSTRACT

An animal behavior training apparatus includes an activation system and a feeding device. The activation system includes a sensing device acting as a switch and being in an electric circuit with an electric motor forming part of a feeding mechanism of the feeding device which has a container to receive foodstuffs or treats. The sensing device when activated causes the feeding mechanism to discharge a measure of foodstuffs or treats from the container. The container of the feeding device is upright and has an open top closable by a lid and the bottom of the container communicates with the feeding mechanism.

14 Claims, 4 Drawing Sheets

ANIMAL BEHAVIOR TRAINING APPARATUS

CROSS-REFERENCE TO RELATED APPLICATIONS

This application is a 35 USC 371 application of PCT/GB 01/03884 filed on Aug. 30, 2001.

BACKGROUND OF THE INVENTION

Field of the Invention

This invention relates to an animal behavioral training apparatus, for example for house toilet training, or attitude training, or the management of behavior of domestic animals, particularly but not exclusively dogs.

The present invention is directed to an animal behavior training apparatus comprising in combination an activation means and a feeding device, the means having a sensing device acting as a switch and being in an electric circuit with an electric motor forming part of a feeding mechanism of the feeding device which has a container to receive foodstuffs or treats, the sensing device when activated causing the feeding mechanism to discharge a measure of foodstuffs or treats from the container.

Preferably, the container of the feeding device is upright and has an open top closable by a lid, the bottom of the container communicating with the feeding mechanism. The container preferably has one or more internal sloping guide plates to direct flow of any foodstuffs or treats inside the container and towards the feeding mechanism. The container is desirably of rectangular cross-section.

Preferably also, the feeding mechanism is an elongate tray of flexible material to the underside of which the electric motor is mounted to impart when energized, vibration to the tray, the tray being mounted at one end to a side of the container and at its opposite end resting on a support. The end of the tray resting on the support is the discharge end and desirably has a lip upwardly directed and inclined towards the side of the container to which the other end is mounted. Two sloping guide plates are beneficially provided in the container one above the other and one extending inwards from each of opposite sides whereby flow of material into the containers is directed downwardly from the upper guide plate onto the lower guide plate then onto the tray.

Preferably further, the training apparatus is for toilet training and the activation means has a catchment device to hold any liquid or waste matter and the sensing device is for moisture or temperature activation. The catchment device preferably has a mat comprising an impervious bottom sheet over part of all of which an absorbent pad is provided covered by a liquid permeable top sheet. The sensing device is of metallic foil maze type arrangement provided over the top sheet with electrical contact being made when liquid extends between foil parts of the arrangement of different polarity.

Alternatively, the catchment device may be a tray having a bottom and an upstanding sidewall incorporating a ledge spaced above and substantially parallel to the bottom, the ledge supporting a platform extending over the bottom. The platform is preferably a metallic grid having a porous fabric thereover to allow urine to pass therethrough into the catchment space therebelow. As part of the sensing device, the bottom of the tray is desirably covered with a thin metallic foil attached thereto, the metallic grid forming a second part of the sensing device.

The training apparatus may alternatively be for correcting behavior and the activation means may alternatively be a sound or silence activated device.

BRIEF DESCRIPTION OF THE DRAWINGS

Embodiments of the present invention will be described more fully herein below, with reference to the accompanying diagrammatic drawings, in which.

DESCRIPTION OF THE PREFERRED DEVICE

Figure 1:
FIG. 1 is a cross-section of an activation means of a pet toilet training apparatus according to a first embodiment of the present invention.
Figure 2:
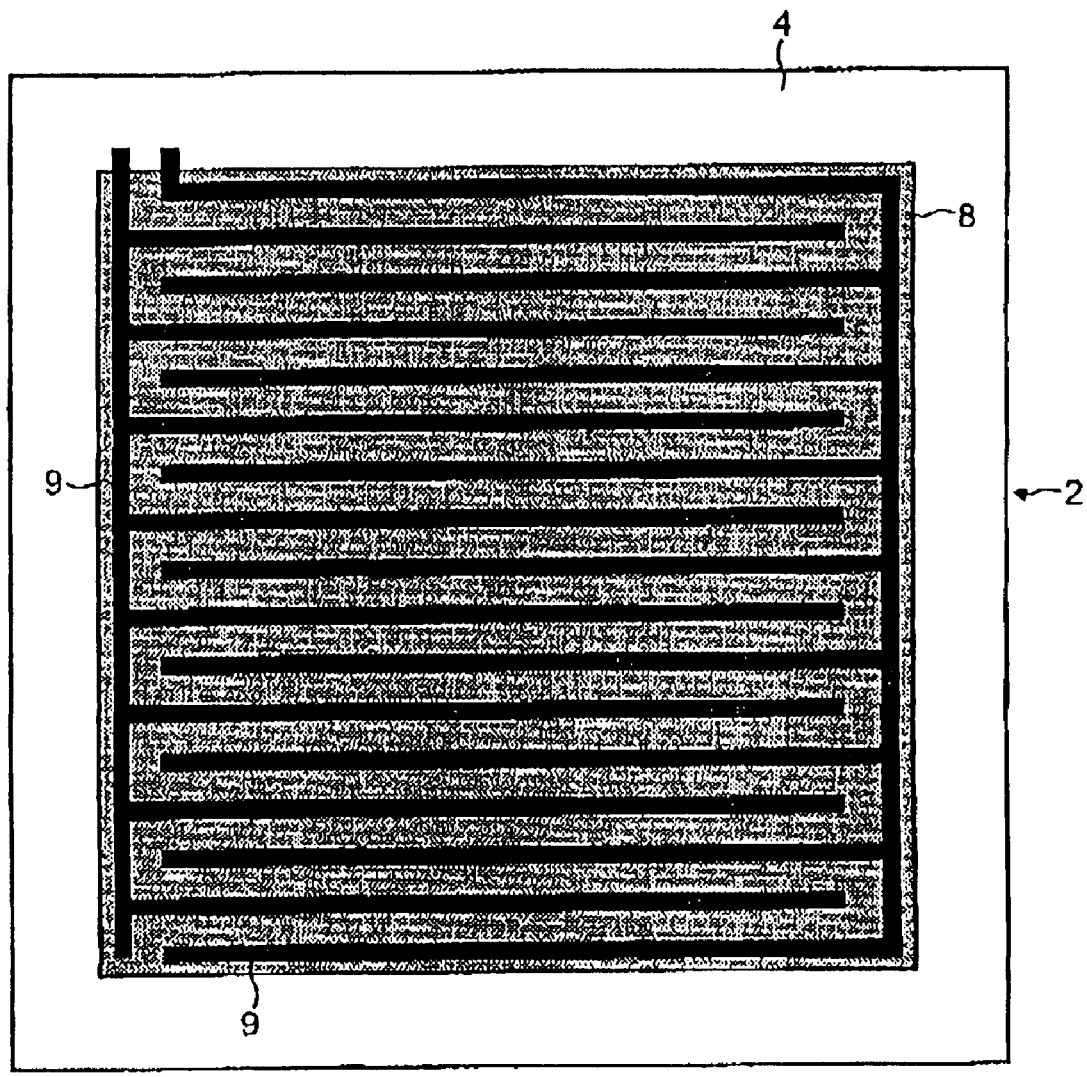
FIG. 2 is a plan view of the activation means shown in FIG. 1.

Referring to the drawings, a first embodiment of a pet toilet training apparatus comprises in combination an activation means 1 and a feeding device 12. The activation means has a catchment device 2 to hold any liquid or waste matter and a sensing device for moisture or temperature activation. The catchment device 2 is in the form of a mat comprising an impervious bottom sheet 4 over part or all of which an absorbent pad 6 is provided covered by a liquid permeable top sheet 8. The sensing device 7 is connected in an electrical circuit (not shown) with an electric motor 34 forming part of a feeding mechanism of the feeding device 12. The sensing device 7 acts as a switch and is a two-part metallic foil mazetype arrangement 9 provided over the top sheet 8, each part having a different polarity, with electrical contact being made when liquid extends between foil parts of the arrangement of different polarity to operate the feeding mechanism.

Figure 3:
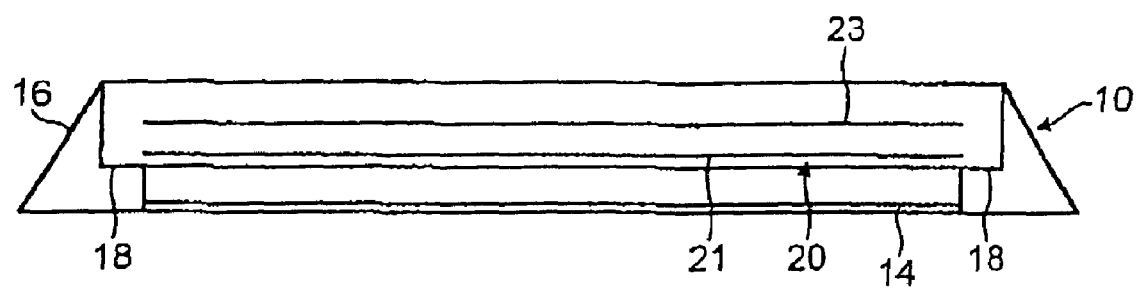
FIG. 3 is cross-section of an activation means of the pet toilet training apparatus according to a second embodiment of the present invention.
Figure 4:
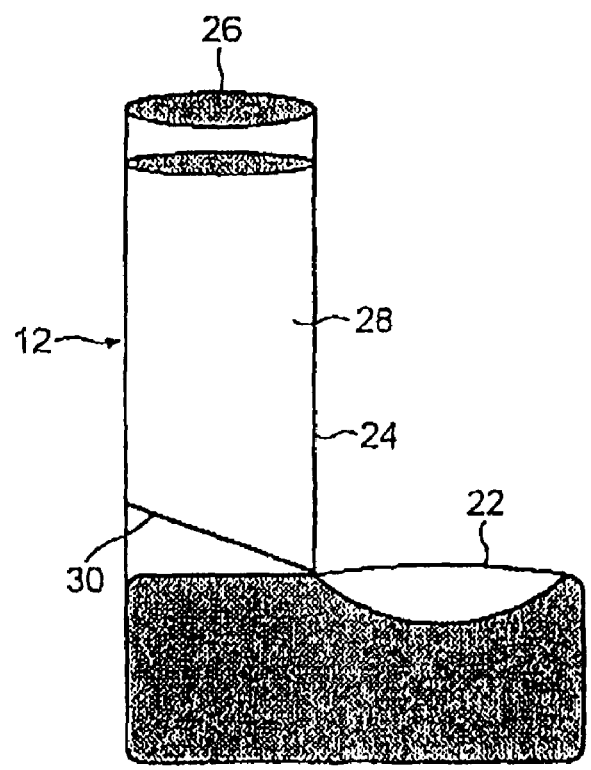
FIG. 4 is a side elevational view of a feeding device of the apparatus as shown in FIG. 3.
Figure 5:
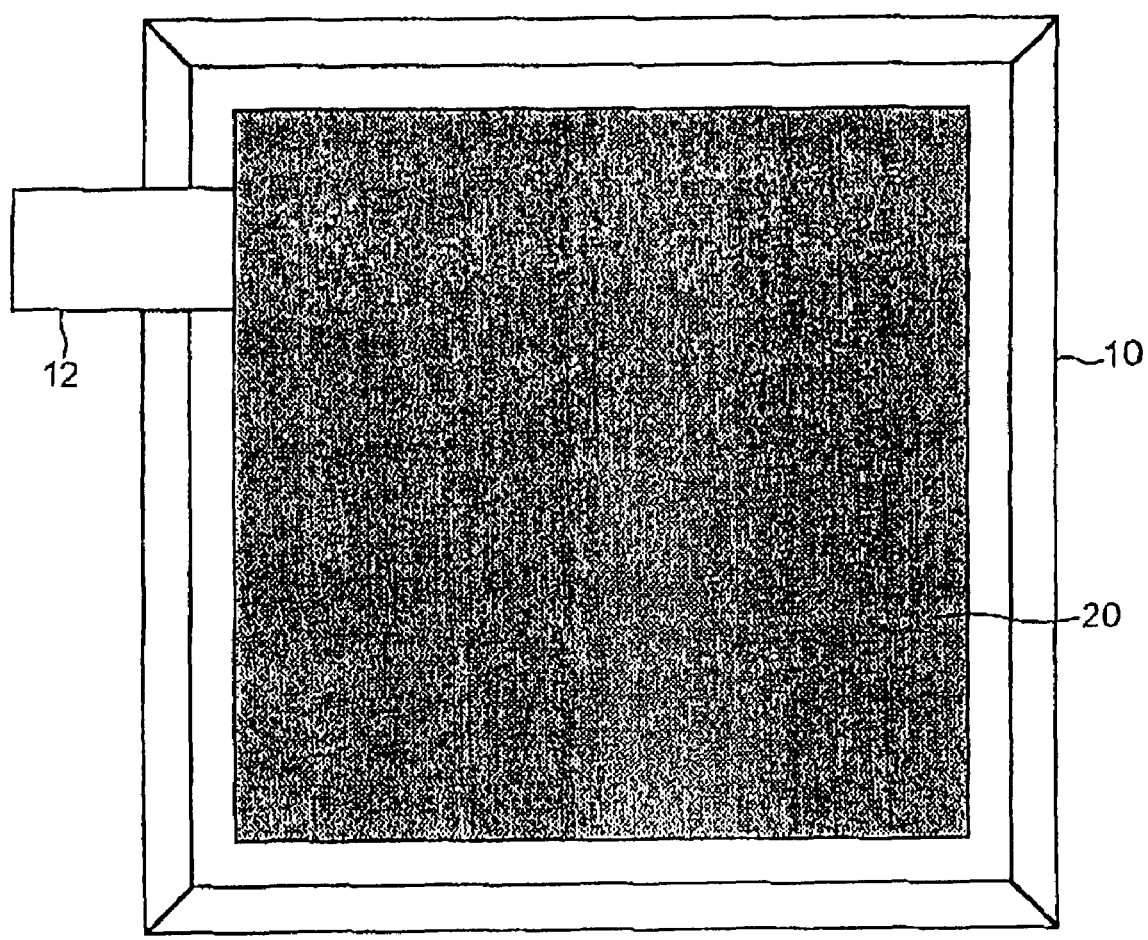
FIG. 5 is a plan view showing the activation means and a feeding device.
Figure 6:
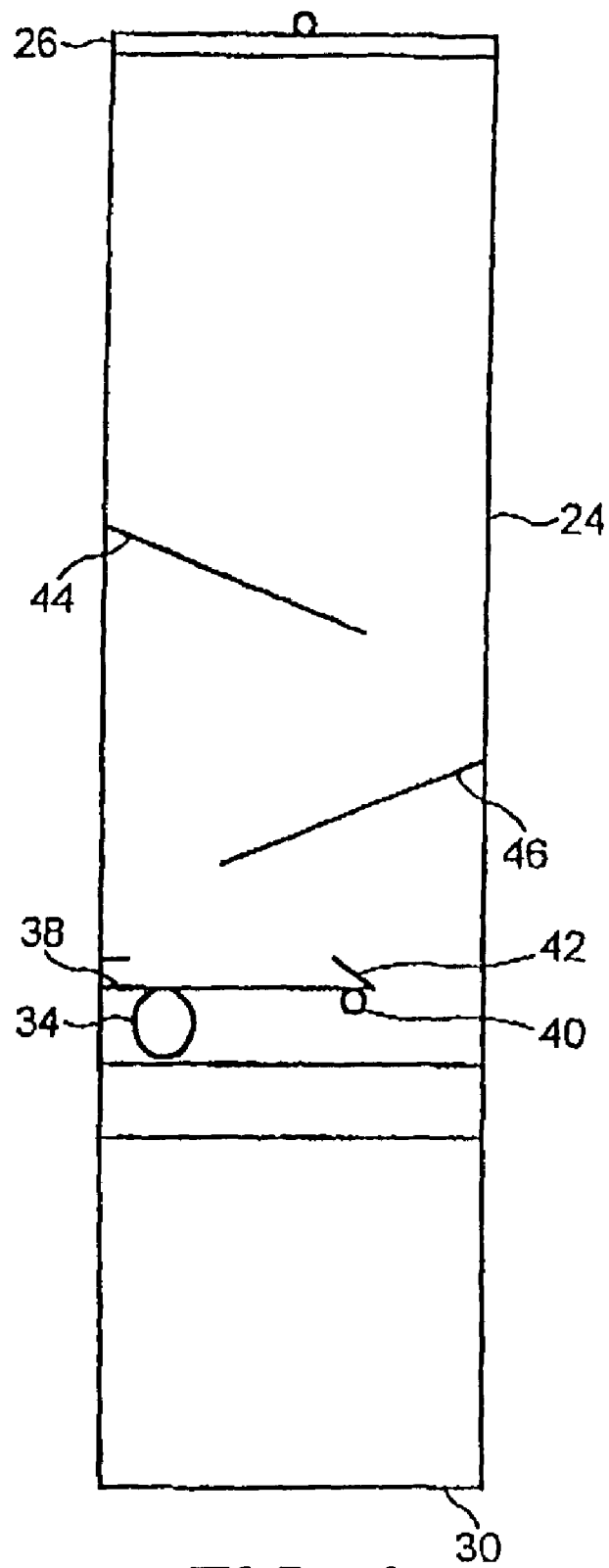
FIG. 6 is a vertical cross-sectional view of the feeding device.

Referring to FIGS. 3 to 5 of the drawings, a second embodiment of a pet toilet training apparatus comprises in combination an activation means in the form of a catchment device to hold any liquid or waste matter, the device being a rectangular catchment tray 10 and a feeding or dispensing device 12. The tray 10 has a bottom 14 and an upstanding wall sidewall 16. The sidewall 16 incorporates a ledge 18 spaced above and substantially parallel to the bottom 14. The tray 10 is molded from a plastics material. The ledge 18 supports a platform 20 extending over the bottom 14. A two part sensing device is provided for moisture or temperature activation, the parts of the sensing device being connected in an electric circuit (not shown) with the electric motor 34 forming part of a feeding mechanism of the feeding device 12. The platform 20 is a grid 21 of stainless steel having a porous fabric 23 removably secured thereover, the fabric 23 allowing urine to pass therethrough into the catchment space therebelow. As one part of the sensing device, the bottom tray 10 is covered with a thin metallic foil adhered thereto, the second part being formed by the metallic grid 21. The fabric 23 is removable for cleaning.

In common to both embodiments, the feeding device 12 is positioned at or near to the mat 2 or the tray 10 with a dispensing bowl 22 accessible from the mat 2 or the tray 10.

The sensing device, when activated by the moisture or temperature of the urine, causes the feeding mechanism to discharge into the bowl 22 a measure of foodstuffs or treats from the feeding device 12. The feeding device 12 has an upright container 24 of rectangular cross-section for holding fluent foodstuffs 28 or treats. The container 24 has an open top closable by a lid 26 and communicates with the feeding mechanism. The bottom 30 of the container 24 slopes downwards towards the outlet and the dispensing bowl 22. A separate dispensing bowl, such as an animal's normal feeding bowl may be used instead of an integral bowl as shown. The container 24 has two internal sloping guide plates 44, 46 to direct flow of any foodstuffs or treats inside the container and towards the feeding mechanism.

The feeding mechanism is an elongate tray 38 of flexible material to the underside of which the electric motor 34 is mounted to impart, when energized, vibration to the tray 38. The tray 38 is mounted at one end to a side of the container 24 and at its opposite end rests on a stationary rod support 40. The end of the tray 38 resting on the support 40 is the discharge end and has a lip 42 upwardly directed and inclined towards the side of the container 24 to which the other end is mounted. The two sloping guide plates 44, 46 provided internally of the container 24 one above the other slope in opposite directions, one extending inwards from each of opposite sides whereby flow of material, i.e. foodstuffs or treats, into the container 24 is directed downwardly from the upper guide 44 onto the lower guide plate 46 then onto the tray 38. The foodstuffs catch behind the lip 42 and an amount builds up. Vibration caused by the motor 34, causes a proportion of that amount to be discharged over the lip. By timing the period of energization of the motor, a fairly accurate amount of foodstuffs or treats can be discharged. A timing mechanism is incorporated into the sensing device. The lip 42 prevents foodstuffs or treats failing off the tray when it is replenished by more falling down from the guide plates 44, 46.

A dog or puppy reacts inter alia to urine smells and to pass urine will normally seek out its or another's smell and then perform. In a house, a householder heretofore may have placed a newspaper in a corner of a kitchen or laundry room for this purpose but this is messy. The invention described above is not only of benefit to attract the dog or puppy by smell but also by providing foodstuffs or a treat every time the dog or puppy performs on the mat 2 or tray 10 and therefore is much more attractive for both householder and animal. When urine flows over the two parts of the sensing device, a contact is made which energizes the motor 34 to operate the feeding mechanism to discharge one measure of foodstuffs or treats.

In further embodiments of the training apparatus, the correcting of behavior of animals is provided for, such behavior being dogs barking when they shouldn't or staying silent when they should bark. The activation means in these embodiments require the sensing device to be sound or silence activated, the particular requirement being determined beforehand when presetting the device.

Variations and modifications can be made without departing from the scope of the invention described above and as claimed hereinafter.

The invention claimed is:

1. An animal behavior training apparatus comprising, in combination,
    an activation means triggered by the toileting actions of an animal,
    a feeding device including a feed dispensing mechanism and a container to receive foodstuffs or treats,
    the activation means including a sensing device acting as a switch and being connected in an electric circuit with an electric motor forming part of the feed dispensing mechanism of the feeding device,
    the sensing device when activated causing the feeding mechanism to discharge a measure of foodstuffs or treats from the container,
    the feeding mechanism comprising an elongate tray,
    vibration means operable by the electric motor and mounted to impart when energized, vibration to the tray,
    the tray having one end mounted at one side of the container and its opposite end resting on a support, the tray being of flexible material and substantially horizontally oriented, the end of the tray resting on the support being the discharge end and having a lip upwardly directed and inclined towards the side of the container to which the other end is mounted.

2. Apparatus according to claim 1, wherein the container of the feeding device is upright and has an open top closable by a lid, and wherein the bottom of the container has an opening communicating with the feeding mechanism.

3. Apparatus according to claim 2, wherein the container has one or more internal sloping guide plates to direct flow of any foodstuffs or treats inside the container and towards the feeding mechanism.

4. Apparatus according to claim 3, wherein the container is of rectangular cross-section.

5. Apparatus according to claim 4, wherein two sloping guide plates are provided in the container one above the other and extending one inwards from each of opposite sides whereby flow of material into the containers is directed downwardly from the upper guide plate onto the lower guide plate then onto the tray.

6. Apparatus according to claim 1, wherein the training apparatus is an animal behavior correcting apparatus, and the activation means is a sound or silence activated device.

7. An animal behavior training apparatus comprising, in combination,
    an activation means triggered by the toileting actions of an animal,
    a feeding device including a feed dispensing mechanism and a container to receive foodstuffs or treats,
    the activation means including a sensing device acting as a switch and being connected in an electric circuit with an electric motor forming part of the feed dispensing mechanism of the feeding device,
    the sensing device when activated causing the feeding mechanism to discharge a measure of foodstuffs or treats from the container,
    the feeding mechanism comprising an elongate tray,
    vibration means operable by the electric motor and mounted to impart when energized, vibration to the tray,
    the tray having one end mounted at one side of the container and its opposite end resting on a support, the tray being of flexible material and substantially horizontally oriented, the end of the tray resting on the support being the discharge end and having a lip upwardly directed and inclined towards the side of the container to which the other end is mounted, wherein the apparatus is a toilet training apparatus, wherein the activation means has a catchment device to hold any liquid or waste matter, and wherein the sensing device for moisture or temperature is activated.

8. Apparatus according to claim 7, wherein the catchment device comprises a mat including an impervious bottom sheet, an absorbent pad extending over part or all of the bottom sheet, and a liquid permeable top sheet covering the absorbent pad.

9. Apparatus according to claim 8, wherein the sensing device comprises a metallic foil maze arrangement provided over the top sheet with electrical contact being made when liquid extends between foil parts of the arrangement of different polarity.

10. Apparatus according to claim 7, wherein the catchment device comprises a tray having a bottom and an upstanding sidewall, the sidewall incorporating a ledge spaced above and substantially parallel to the bottom to form a catchment space, a platform supported on the ledge and extending over the bottom, the platform being a metallic grid having a porous fabric thereover to allow urine to pass therethrough into the catchment space.

11. Apparatus according to claim 10, further comprising a metallic foil extending over and covering the bottom of the tray, the metallic grid forming a second part of the sensing device.

12. Apparatus according to claim 1, further comprising two sloping guide plates in the container one above the other and one extending inwards from each of opposite sides whereby the flow of material into the containers is directed downwardly from the upper guide plate onto the lower guide plate then onto a tray.

13. An animal behavior training apparatus comprising, in combination, an activation means triggered by the toileting actions of an animal, a feeding device including a feed dispensing mechanism and a container to receive foodstuffs or treats, the activation means including a sensing device acting as a switch and being connected in an electric circuit with an electric motor forming part of the feed dispensing mechanism of the feeding device, the sensing device when activated causing the feeding mechanism to discharge a measure of foodstuffs or treats from the container, the feeding mechanism comprising an elongate tray, vibration means operable by the electric motor and mounted to impart when energized, vibration to the tray, wherein the apparatus is a toilet training apparatus, wherein the activation means has a catchment device to hold any liquid or waste matter, and wherein the sensing device for moisture or temperature is activated.

14. An animal behavior training apparatus comprising, in combination, an activation means triggered by either a sound or a silence of an animal, a feeding device including a feed dispensing mechanism and a container to receive foodstuffs or treats, the activation means including a sensing device acting as a switch and being connected in an electric circuit with an electric motor forming part of the feed dispensing mechanism of the feeding device, the sensing device when activated causing the feeding mechanism to discharge a measure of foodstuffs or treats from the container, the feeding mechanism comprising an elongate tray, vibration means operable by the electric motor and mounted to impart when energized, vibration to the tray, the tray having one end mounted at one side of the container and its opposite end resting on a support, the tray being of flexible material and substantially horizontally oriented, the end of the tray resting on the support being the discharge end and having a lip upwardly directed and inclined towards the side of the container to which the other end is mounted.

\* \* \* \* \*

UNITED STATES PATENT AND TRADEMARK OFFICE
CERTIFICATE OF CORRECTION

PATENT NO. : 6,983,719 B2
DATED : January 10, 2006
INVENTOR(S) : Gavin Armstrong It is certified that error appears in the above-identified patent and that said Letters Patent is hereby corrected as shown below:

<u>Title page,</u>
Item [30], should read as follows:
-- [30]     Foreign Application Priority Data

August 30, 2000   (GB)   ...   0021205.0
    January 23, 2001  (GB)   ...   0101716.9 --.

Signed and Sealed this

Twenty-first Day of February, 2006

JON W. DUDAS
*Director of the United States Patent and Trademark Office*